United States Patent [19]

Hillemann

[11] 3,854,389
[45] Dec. 17, 1974

[54] APPARATUS FOR PRODUCING LIQUID COFFEE

[75] Inventor: Robert E. Hillemann, Indianapolis, Ind.

[73] Assignee: Harold G. Crane, Carmel, Ill. ; a part interest

[22] Filed: Apr. 4, 1973

[21] Appl. No.: 347,816

[52] U.S. Cl. .................................... 99/295, 99/306
[51] Int. Cl. ........................................... A47j 31/00
[58] Field of Search ............ 99/304, 306, 295, 323, 99/323.3, 316, 317, 321, 322; 426/77, 78, 79

[56] References Cited
UNITED STATES PATENTS

| | | | |
|---|---|---|---|
| 1,489,893 | 4/1924 | Malcamp | 99/306 |
| 2,047,134 | 7/1936 | Coleman | 99/295 X |
| 2,401,529 | 6/1946 | Varney | 99/306 |
| 2,786,577 | 3/1957 | Schlumbohm | 99/302 |
| 2,951,431 | 9/1960 | Hugentobler | 99/306 |
| 3,199,437 | 8/1965 | Nelsen | 99/317 |
| 3,484,245 | 12/1969 | Goto | 99/304 |
| 3,695,167 | 10/1972 | Schmidt | 99/306 |

*Primary Examiner*—Robert W. Jenkins
*Attorney, Agent, or Firm*—Woodard, Weikart, Emhardt & Naughton

[57] ABSTRACT

An apparatus for producing liquid coffee. A container has a partition dividing the container into a first compartment and a second compartment. Coffee is placed in the first compartment whereas cold water is inserted into the second compartment and allowed to drain through the partition into the second compartment. The bottom of the container is sealed by a filter having a removable seal mounted thereon by adhesives. Removal of the seal allows the liquid coffee to drain through the filter. In one embodiment, the seal is positioned inside the container and is removed from the filter by means of a pull string. In another embodiment, the seal is positioned externally of the container. In yet another embodiment, the filter is externally sealed by a cone-shaped projection which extends downwardly from the container and which may be removed from the container. A holder receives the container and spaces the container upwardly from the bottom wall of the holder forming a cavity to receive the filtered liquid coffee. The liquid coffee is then refrigerated.

9 Claims, 6 Drawing Figures

PATENTED DEC 17 1974
3,854,389
SHEET 1 OF 2
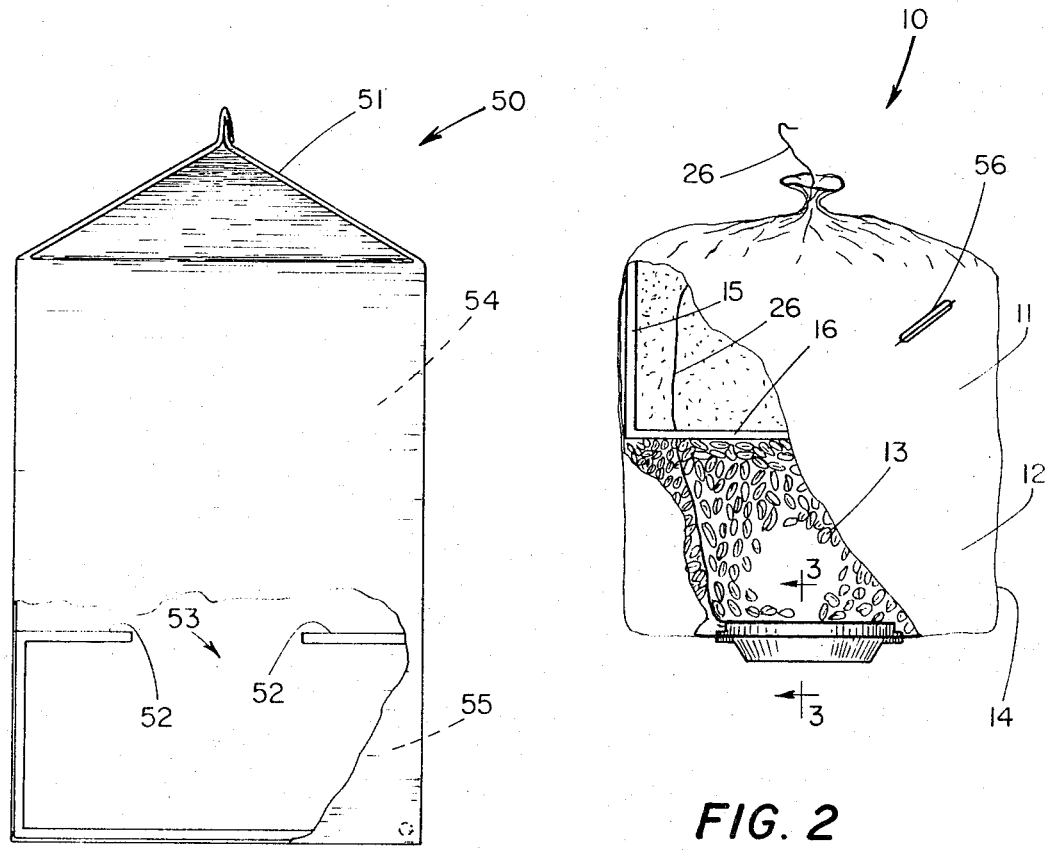
FIG. 1
FIG. 2
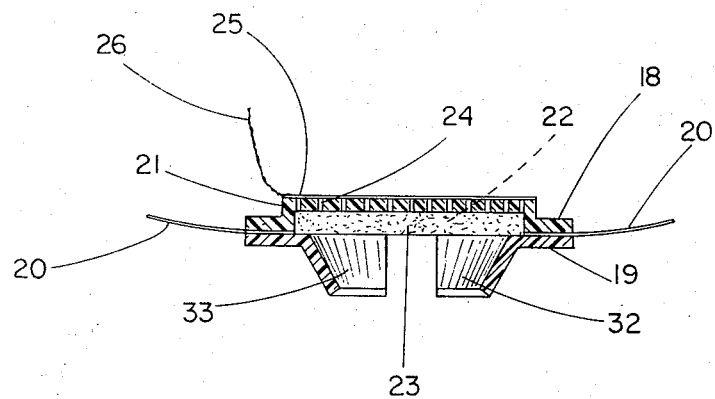
FIG. 3

APPARATUS FOR PRODUCING LIQUID COFFEE

BACKGROUND OF THE INVENTION

1. Field of the Invention

This invention is in the field of coffee making devices and methods.

2. Description of the Prior Art

A coffee which is provided with a better flavor and which is free from bitterness, oily principals and high caffeine content is provided by producing the coffee utilizing only cold water in combination with coffee. After the liquid coffee is produced, the liquid may be heated to the desired temperature prior to drinking. This procedure is well known and is discussed in the U.S. Pat. No. 3,199,437 issued to S. E. Nelson. In spite of the fact that this procedure for producing coffee from cold water is known, the procedure has not been widely adopted due to the fact that a method and container have not been provided which allows the consumer to easily produce the coffee. Disclosed herein is a method and apparatus which is designed to allow the consumer to easily produce and store the coffee with a relatively low expenditure of time, effort and money. Three U.S. Pat. Nos. which disclose devices of pertinence are the following:

2,047,134 issued to W. C. Coleman;
2,401,529 issued to J. A. Varney et al; and
3,786,577 issued to P. Schlumbohm.

The container disclosed herein is provided with a bottom compartment filled with coffee and a top empty compartment which is filled with cold water subsequent to the consumer purchasing the container. An interior support is provided in the water receiving container to prevent collapse of the container during the vacuum sealing which occurs prior to the purchase. A filter is built into the container thereby allowing for the liquid coffee to be easily strained and filtered into another container. Various means are provided to control the flow of the filtered liquid coffee from the container.

SUMMARY OF THE INVENTION

One embodiment of the present invention is an apparatus for producing liquid coffee comprising a disposable first container having an openable top and a sealed bottom, a partition mounted in the container dividing the container into a first compartment and a second compartment for receiving cold water, the partition being porous allowing the cold water to pass therethrough and into the second compartment, coffee positioned in the second compartment with the container and the partition limiting movement of the coffee, and filter means mounted to the sealed bottom of the container being operable to controllably discharge filtered liquid from the second compartment after the cold water has passed therein.

It is an object of the present invention to provide a new and improved apparatus for producing coffee which contains a relatively small amount of caffeine and oils.

A further object of the present invention is to provide a disposable container for producing liquid coffee from cold water and coffee.

Related objects and advantages of the present invention will be apparent from the following description.

BRIEF DESCRIPTION OF THE DRAWINGS

FIG. 1 is a fragmentary side view of a holder for supporting the container of FIG. 2.

FIG. 2 is a fragmentary side view of a container for producing liquid coffee from cold water and coffee.

FIG. 3 is an enlarged cross sectional view taken along the line 3—3 of FIG. 2 and viewed in the direction of the arrows.

DESCRIPTION OF THE PREFERRED EMBODIMENTS

Figure 4:
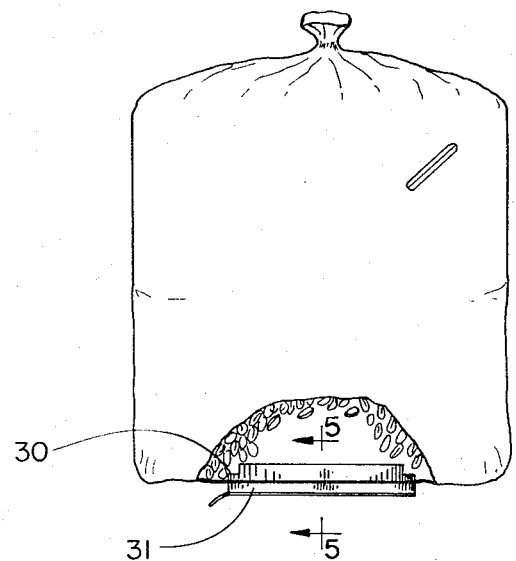
FIG. 4 is the same view as FIG. 2 only showing an alternate embodiment of the filter mounted to the container.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to FIG. 2, there is shown a container 10 for producing liquid coffee. Container 10 is disposable since it is produced from low cost materials in a relatively inexpensive manner. The side walls and bottom wall of container 10 are produced from plastic having a thickness of approximately 0.005 inches. The container includes a first compartment 11 and a second compartment 12 which are separated by partition 16. Compartment 12 is filled with coffee 13, whereas compartment 11 is empty until filled with cold water by the consumer. Partition 16 and the side walls 14 as well as the bottom wall of the container limit the movement of coffee 13 and prevent the coffee from passing into compartment 11.

A continuous rigid plastic wall 15 extends circumferentially around compartment 11 and is immediately inward of the side wall of the container. Rigid wall 15 is mounted integrally atop partition 16 which extends across the container. Walls 13 and 15 may be produced from a material such as plastic to minimize the cost of the container. Prior to purchase of the container by the consumer, the top of the container is vacuum sealed to maintain the freshness of the coffee. The side walls of the container are prevented from collapsing inwardly during the vacuum sealing since wall 15 is rigid and is positioned immediately inward against the flexible side walls of the container. Partition 16 is porous to allow the cold water subsequently inserted by the purchaser into compartment 11 to pass from compartment 11 and into compartment 12.

A pair of spaced apart rings 18 and 19 are mounted to the bottom wall 20 of container 10. Bottom wall 20 is sealingly secured between rings 18 and 19. Plastic wall 20 may be sealed to the rings by means such as heat sealing. Ring 18 has an upraised portion 21 which defines a cavity 22. Ring 19 extends inwardly beneath cavity 22 thereby retaining filter 23 within the cavity. A plurality of apertures 24 are provided in upraised portion 21 to allow liquid to pass through ring 18 and into cavity 22 thereby being strained and filtered by filter 23. In the embodiment shown in FIG. 3, a removable seal 25 is adhesively mounted to upraised portion 21 thereby sealingly closing apertures 24. String 26 is attached to seal 25 and extends upwardly through compartment 12, partition 16 and compartment 11. After the cold water has been added to compartment 11 and allowed to mix for a sufficient length of time with the coffee within compartment 12, string 26 may be pulled upwardly thereby removing seal 25 from upraised portion 21 and allowing the liquid coffee to pass through apertures 24 and filter 23. Filter 23 may be produced from a material such as paper. It is anticipated that container 10 be of sufficient size to hold one pound of coffee in compartment 12 and sixty ounces of cold water in compartment 11.

Figure 5:
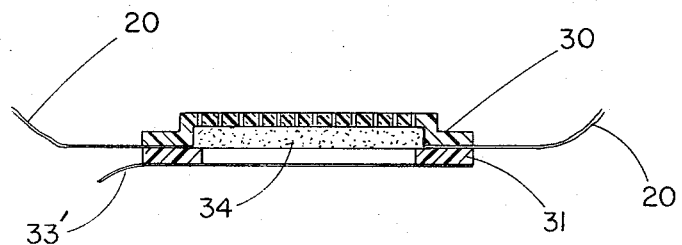
FIG. 5 is an enlarged cross sectional view taken along the line 5—5 of FIG. 4 and viewed in the direction of the arrows.

In the embodiment shown in FIGS. 4 and 5, ring 30 is identical with respect to ring 18. Ring 31 is identical to ring 19 with the exception that ring 31 is not provided with the downwardly extending projections 32 and 33 of ring 19. Seal 33 is adhesively secured to the bottom surface of ring 31 and may be removed to allow the liquid coffee within the container to pass through rings 30 and 31 and filter 34.

Figure 6:
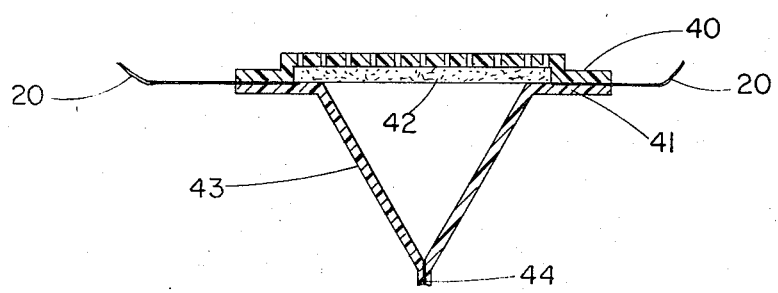
FIG. 6 is the same view as FIG. 5 only showing yet another embodiment of the filter.

In the embodiment shown in FIG. 6, ring 40 is identical to ring 30 whereas ring 41 is identical to ring 31 with the exception that ring 41 includes a cone-shaped projection 43 which extends downwardly and inwardly retaining filter 42. The lower tip 44 of projection 43 is heat sealed. Projection 43 is produced from plastic of appropriate thickness to allow easy cutting. After projection 43 is cut, the liquid coffee within the container then passes through ring 40 and filter 42 and out through ring 41.

Holder 50 (FIG. 1) is designed to receive and hold container 10. Holder 50 may have a variety of designs such as the milk type of carton shown in FIG. 1. The top end 51 of holder 50 may be opened and container 10 inserted down into compartment 54 of the container. A pair of walls 52 are mounted inside holder 50 and defines an opening 53 through which the filter of container 10 may project. Thus, by then removing the seal, the liquid coffee may be allowed to drain through opening 53 into compartment 55. A suitable drain may be provided at the bottom of holder 50 to allow for the withdrawal of the coffee from compartment 55.

After top 51 of holder 50 is opened and container 10 is inserted into the holder, the top 17 of container 10 may then be opened. Cold water is then poured into compartment 11 and allowed to remain in the container so as to mix with the coffee in compartment 12 thereby producing liquid coffee. Best results have been obtained by allowing the cold water to mix with the coffee for a period of approximately twelve hours prior to removing the seal from the filter either by pulling string 26, by removing seal 33' or by cutting cone-shaped projection 43. As the liquid coffee passes from compartment 12, the liquid coffee will be filtered and will pass into compartment 55 of holder 50. Container 10 may then be removed from holder 50 with holder 50 then being placed in a refrigerated area until the coffee is to be heated and consumed.

A conventional pull string 56 is mounted to the side wall of container 10 and is designed to allow the user to conveniently and quickly close the top of the container after the liquid coffee has been drained therefrom. Many variations are contemplated and included in the present invention. For example, wall 15 may be separate from partition 16 so as to allow removal of wall 15 prior to the insertion of the cold water. Various types of holders 50 may be utilized with container 10. For example, a holder may be provided which spaces the container upwardly above another container thereby allowing ready access to seal 33' or cone-shaped projection 43 while the container is being held. It will be obvious from the above description that the present invention provides a new and improved method for producing liquid instant coffee with relatively low caffeine and oil content. It will be further obvious from the above description that the present invention provides a new and improved apparatus for producing liquid instant coffee having low caffeine and oil content. Likewise, it will be obvious that the container disclosed herein for producing liquid instant coffee is relatively inexpensive to produce therefore providing for a disposable capability.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

I claim:

1. An apparatus for producing liquid coffee comprising:
   a disposable first container having an openable top and a sealed bottom;
   a partition mounted in said container dividing said container into a first compartment and a second compartment for receiving cold water, said partition being porous allowing said cold water to pass therethrough and into said second compartment;
   coffee positioned in said second compartment with said container and said partition limiting movement of said coffee; and,
   a filter mounted to said sealed bottom of said container;
   supporting means mounted within said first compartment of said container and being operable to maintain the configuration of said first compartment of said container; and wherein:
   said container includes plastic flexible side walls defining said first compartment and said second compartment, said side walls are prevented from inward collapse by said supporting means, said container further includes a plastic bottom wall joined to said flexible side walls.

2. The apparatus of claim 1 wherein:
   said supporting means includes a continuous rigid wall positioned inwardly against said flexible side walls and mounted integrally atop said partition which includes a wall extending inwardly across said container.

3. The apparatus of claim 1 wherein:
   said filter includes a pair of spaced apart rings with said plastic bottom wall sealingly secured therebetween, said filter further includes a removable cover adhesively mounted to one of said rings preventing passage of liquid therethrough.

4. The apparatus of claim 3 wherein:
said cover includes a string attached thereto extending through said second compartment and said partition and into said first compartment.

5. The apparatus of claim 3 wherein:
said rings include a top ring positioned inside said second compartment which has an upraised perforated portion defining a cavity in which said filter is mounted and a bottom ring extending at least partially beneath said cavity retaining said filter.

6. The apparatus of claim 5 wherein:
said bottom ring includes a cone-shaped projection extending downwardly and further comprising:
a holder having a top compartment for receiving said container and a bottom compartment into which said liquid coffee drains upon removal of said cone-shaped projection, said holder includes a wall with an aperture into which said bottom ring is fittable.

7. An apparatus for producing liquid coffee comprising:
a disposable first container having an openable top and a sealed bottom;
first means mounted in said container dividing said container to form a bottom portion and a top portion;
coffee positioned in said bottom portion with said means and said container limiting movement of said coffee;
a filter mounted to said sealed bottom of said container;
supporting means mounted within said container and being operable to maintain the configuration of said bottom portion of said container; and wherein:

said container includes flexible side walls prevented from inward collapse by said supporting means, said container further includes a bottom wall joined to said flexible side walls.

8. The apparatus of claim 7 wherein said supporting means includes a rigid wall positioned inwardly against said flexible side walls and mounted atop said first means which includes a wall extending inwardly across said container.

9. The combination of:
a disposable first container having an openable top and a sealed bottom and having a bottom portion and a top portion;
coffee solids positioned in said bottom portion;
cold water positioned in said top portion; and,
a filter mounted to said sealed bottom of said container;
supporting means mounted within said bottom portion of said container being operable to maintain the configuration of said bottom portion of said container; and wherein:
said container includes plastic flexible side walls defining said bottom portion and said top portion, said side walls are prevented from inward collapse by said supporting means, said container further includes a bottom wall joined to said flexible side walls.

* * * * *

UNITED STATES PATENT OFFICE
CERTIFICATE OF CORRECTION

Patent No. 3,854,389      Dated December 17, 1974

Inventor(s) Robert E. Hillemann

It is certified that error appears in the above-identified patent and that said Letters Patent are hereby corrected as shown below:

On column 6, line 2, please change the word "bottom" to --top--.

On column 6, line 22, please change the word "bottom" to --top--.

On column 6, line 24, please change the word "bottom" to --top--.

Signed and sealed this 15th day of July 1975.

(SEAL)
Attest:

RUTH C. MASON
Attesting Officer

C. MARSHALL DANN
Commissioner of Patents
and Trademarks